(12) United States Patent
Asrani

(10) Patent No.: US 9,990,086 B2
(45) Date of Patent: Jun. 5, 2018

(54) CONTROLLING INPUT AND OUTPUT ON MULTIPLE SIDES OF A COMPUTING DEVICE

(71) Applicant: Google Inc., Mountain View, CA (US)

(72) Inventor: Vijay L. Asrani, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/340,529

(22) Filed: Nov. 1, 2016

(65) Prior Publication Data

US 2018/0121012 A1    May 3, 2018

(51) Int. Cl.
    *G06F 3/041*    (2006.01)

(52) U.S. Cl.
    CPC .. *G06F 3/0416* (2013.01); *G06F 2203/04108* (2013.01)

(58) Field of Classification Search
    CPC ............... G06F 3/0416; G06F 3/0304; G06F 2203/04108; G06F 1/1626; G06F 2200/1637
    See application file for complete search history.

(56) References Cited

U.S. PATENT DOCUMENTS

| | | | |
|---|---|---|---|
| 8,775,966 B2 | 7/2014 | Stolyarov et al. | |
| 9,367,095 B2 | 6/2016 | Myers | |
| 2010/0146318 A1* | 6/2010 | Johnson | G01R 31/3624 713/340 |
| 2012/0117506 A1* | 5/2012 | Koch | G06F 3/04886 715/773 |
| 2012/0274613 A1 | 11/2012 | Ishizuka | |
| 2012/0280917 A1 | 11/2012 | Toksvig et al. | |
| 2013/0169545 A1 | 7/2013 | Eaton et al. | |
| 2014/0132514 A1 | 5/2014 | Kuzara et al. | |
| 2014/0289668 A1 | 9/2014 | Mavrody | |
| 2014/0340320 A1* | 11/2014 | VanBlon | G06F 1/1626 345/173 |
| 2015/0084902 A1* | 3/2015 | Atsumi | H04R 17/00 345/173 |

(Continued)

OTHER PUBLICATIONS

Prigg, Is this the iPhone 7? Concept reveals how Apple's next handset could dump the home button and be its biggest redesign ever, DailyMail.com, Oct. 26, 2015, 7 pgs.

(Continued)

*Primary Examiner* — Tom Sheng
(74) *Attorney, Agent, or Firm* — Shumaker & Sieffert, P.A.

(57) ABSTRACT

A computing device includes a housing that includes a front side and a back side. The computing device also includes a first presence-sensitive input component at the front side of the housing, a second presence-sensitive input component at the back side of the housing. The computing device includes at least one object detection sensor configured to generate sensor data. The computing device includes at least one processor, and a memory that includes instructions that cause the at least one processor to: determine whether an object is in the proximity of the computing device, responsive to determining that the object is in the proximity of the computing device, determine whether to disable a particular presence-sensitive input component located at a side of the housing opposite the at least one object detection sensor, and disable the particular presence-sensitive input component.

20 Claims, 3 Drawing Sheets

(56) References Cited

U.S. PATENT DOCUMENTS

| | | | | |
|---|---|---|---|---|
| 2015/0177865 A1* | 6/2015 | Rodzevski | ............... | G06F 3/042 |
| | | | | 345/175 |
| 2015/0261366 A1* | 9/2015 | Wong | ..................... | G06F 1/1626 |
| | | | | 345/173 |
| 2015/0358445 A1* | 12/2015 | Forutanpour | ......... | H04M 1/035 |
| | | | | 455/575.1 |
| 2016/0117037 A1* | 4/2016 | Wang | ..................... | G06F 3/0416 |
| | | | | 455/566 |
| 2016/0259462 A1* | 9/2016 | Liao | ....................... | G06F 3/0416 |

OTHER PUBLICATIONS

Reddy, "Anetenna Design Considerations for LTE Mobile Applications", Long Island Chapter of the IEEE Antennas & Propagation Society, Nov. 8, 2011, 57 pgs.

Rigg, "YotaPhone 2 review: niche and expensive, but seriously cool", Dec. 3, 2014; Retrieved from https://www.engadget.com/2014/12/03/yotaphone-2-review/#/, 39 pgs.

Invitation to Restrict or Pay Additional Fees from International Application No. PCT/US2017/054350, dated Jan. 5, 2018, 14 pp.

Combined Search and Examination Report from counterpart Great Britain Application No. 1715845.2, dated Feb. 22, 2018, 6 pp.

International Search Report and Written Opinion from International Application No. PCT/US2017/054350, dated Mar. 12, 2018, 19 pp.

\* cited by examiner

CONTROLLING INPUT AND OUTPUT ON MULTIPLE SIDES OF A COMPUTING DEVICE

BACKGROUND

Some computing devices include a touch-sensitive display device configured to display information to a user and to receive touch inputs from the user. Touch-sensitive display devices may register touch inputs even when the user did not intend to interact with the touch-sensitive display. For example, the user may place the computing device near the user's head while making a phone call, and the touch-sensitive display may inadvertently register a touch input from the user's cheek. Some computing devices include a proximity sensor on the same side as the touch-sensitive display. If the proximity sensor detects an object near the touch-sensitive display, the computing device may disable the touch-sensitive display to prevent the touch-sensitive display from registering an inadvertent touch input.

SUMMARY

In one example, a computing device includes a housing that includes a front side and a back side, a first presence-sensitive input component located at the front side of the housing, and a second presence-sensitive input component located at the back side of the housing. The computing device also includes at least one object detection sensor configured to generate sensor data. The computing device further includes at least one processor and a memory. The memory includes instructions that, when executed by the at least one processor, cause the at least one processor to determine, based on the sensor data, whether an object is in the proximity of the computing device. The memory also includes instructions that, when executed by the at least one processor, cause the at least one processor to, responsive to determining that the object is in the proximity of the computing device, determine whether to disable a particular presence-sensitive input component located at a side of the housing opposite the at least one object detection sensor. The particular presence-sensitive input component includes one of the first presence-sensitive input component or the second presence-sensitive input component. The memory also includes instructions that, when executed by the at least one processor, cause the at least one processor to, responsive to determining to disable the particular presence-sensitive input component located at the side of the housing opposite the at least one object detection sensor, disable the particular presence-sensitive input component.

In another example, a method includes determining, by a computing device, based on sensor data generated by at least one object detection sensor, whether an object is in the proximity of the computing device. The computing device includes a housing comprising a front side and a back side, a first presence-sensitive input component located at the front side of the housing, and a second presence-sensitive input component located at the back side of the housing. The method also includes responsive to determining that the object is in the proximity of the computing device, determining, by the computing device, whether to disable a particular presence-sensitive input component located at a side of the housing opposite the at least one object detection sensor. The particular presence-sensitive input component includes one of the first presence-sensitive input component or the second presence-sensitive input component. The method further includes responsive to determining to disable the particular presence-sensitive input component located at the side of the housing opposite the at least one object detection sensor, disabling the particular presence-sensitive input component.

A non-transitory computer-readable storage medium encoded with instructions that, when executed by at least one processor of a computing device, cause the at least one processor to determine, based on sensor data generated by at least one object detection sensor, whether an object is in the proximity of the computing device. The computing device includes a housing comprising a front side and a back side, a first presence-sensitive input component located at the front side of the housing, and a second presence-sensitive input component located at the back side of the housing. The non-transitory computer-readable storage medium also includes instructions, that when executed by the at least one processor, cause the at least one processor to, responsive to determining that the object is in the proximity of the computing device, determine, whether to disable a particular presence-sensitive input component located at a side of the housing opposite the at least one object detection sensor. The particular presence-sensitive input component includes one of the first presence-sensitive input component or the second presence-sensitive input component. The non-transitory computer-readable storage medium also includes instructions, that when executed by the at least one processor, cause the at least one processor to, responsive to determining to disable the particular presence-sensitive input component located at the side of the housing opposite the at least one object detection sensor, disable the particular presence-sensitive input component.

The details of one or more examples are set forth in the accompanying drawings and the description below. Other features, objects, and advantages of the disclosure will be apparent from the description and drawings, and from the claims.

DETAILED DESCRIPTION

Figure 1B:
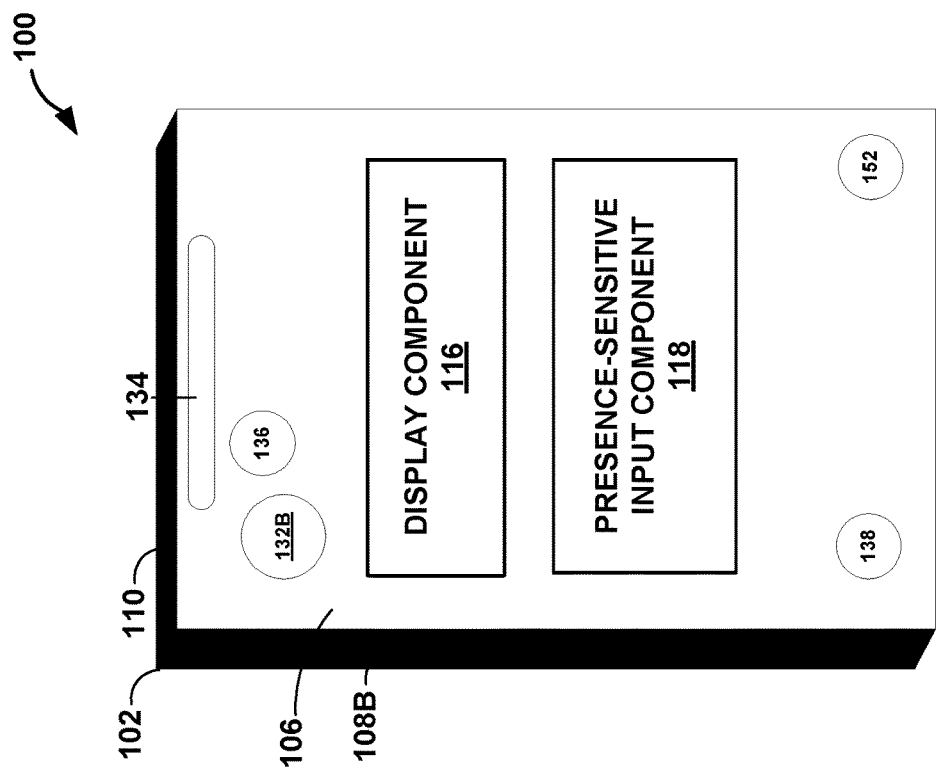
FIGS. 1A-1B are conceptual diagrams illustrating an example computing device that is configured to individually control multiple presence-sensitive input devices and display devices of the computing device, in accordance with one or more aspects of the present disclosure

In general, this disclosure is directed to techniques for individually controlling multiple presence-sensitive input devices and/or output devices of a computing device based on the proximity of objects to the computing device. One side of the computing device may include a touchscreen that acts a presence-sensitive input device as well as an output device. The other side of the computing device may include another display device and a touch-sensitive input device (e.g., a touchpad). The computing device may individually control the touchscreen, the display device, and the touchpad based at least in part on the proximity of objects to either or both sides of the computing device, which may reduce the number of inadvertent touch inputs incorrectly processed by the computing device (e.g., reducing "pocket dialing") and may also reduce the amount of power used by these components.

For example, in contrast to some computing devices that control a touchscreen using a proximity sensor on the same side of the computing device as the touchscreen, this disclosure describes a computing device that includes a touchscreen and an object detection sensor located at opposite sides of the computing device. The computing device may control the touchscreen using the object detection sensor on the side opposite the touchscreen. For instance, the computing device may determine, based on sensor data generated by the object detection sensor, whether an object is in the proximity of the computing device. If the computing device determines that an object is in the proximity of the computing device, the computing device may disable at least a portion of the functionality of the touchscreen. In some examples, the computing device may more accurately determine whether to disable the touchscreen based on the data generated by the object detection sensor and additional data (e.g., information received from other sensors, contextual information, or any combination thereof). By disabling the touchscreen, the computing device may reduce the number of accidental touches registered by the computing device and may reduce the amount of power used by the touchscreen located at the side of computing device opposite the object detection sensor.

Throughout the disclosure, examples are described in which a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 1A:
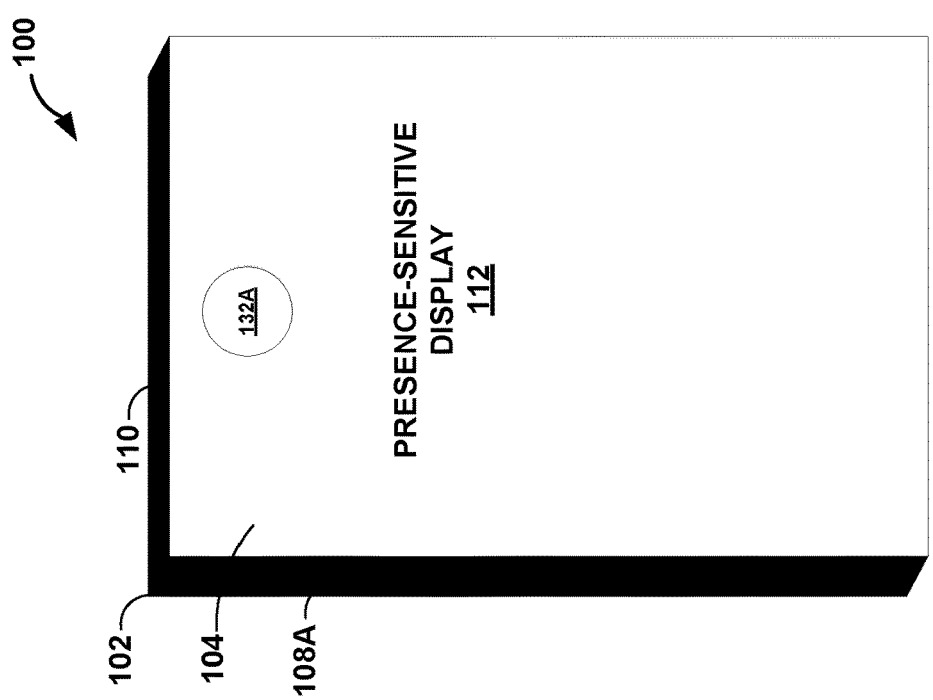

FIGS. 1A-1B are conceptual diagrams illustrating an example computing device that is configured to individually control multiple presence-sensitive input devices and display devices of the computing device, in accordance with one or more aspects of the present disclosure. FIG. 1A illustrates an example front side of computing device 100 and FIG. 1B illustrates an example back side of computing device 100. Computing device 100 may represent a mobile device, such as a smart phone, a tablet computer, a laptop computer, or any other type of portable computing device. Additional examples of computing device 100 include personal digital assistants (PDA), portable gaming systems, media players, e-book readers, mobile television platforms, or any other types mobile or non-mobile computing devices.

Computing device 100 may include a housing 102. In some examples, housing 102 may be constructed of glass, plastic, aluminum, steel, titanium, ceramic, gold, or any other suitable material or combination thereof. In general, housing 102 is a structural element of computing device 100 that may partially or fully enclose other components of computing device 100. Housing 102 includes a front side 104, back side 106, left side 108A and right side 108B (collectively, "right and left sides 108"), top side 110, and a bottom side.

Computing device 100 may include presence-sensitive display (PSD) 112, display component 116, presence-sensitive input component 118, cameras 132A and 132B (collectively, "cameras 132"), speaker 134, object detection sensor 136, microphone 138, and sensor 152. In some examples, display component 116 and presence-sensitive input component 118 may be separate components or may be combined as part of a presence-sensitive display. In some examples, components 132A, 132B, 134, 136, 138, and 152 may be located at various sides of housing 102. For example, as illustrated in FIG. 1A, PSD 112 and camera 132A may be located at front side 104 of housing 102. As illustrated in FIG. 1B, display component 116, presence-sensitive input component 118, camera 132B, speaker 134, object detection sensor 136, microphone 138, and sensor 152 may be located at back side 106 of housing 102. In some examples, at least one of components 132A, 132B, 134, 136, 138, and 152 may be located at other sides of housing 102, such as left side 108A, right side 108B, top side 110, or a bottom side of housing 102. For instance, microphone 138 may be located at left side 108A, right side 108B, top side 110, or the bottom side of housing 102. In some examples, at least one of components 132A, 132B, 134, 136, 138, and 152 may be located within the interior of housing 102. For example, sensor 152 may include a motion sensor (e.g., an accelerometer, gyroscope, etc.) located within the interior of housing 102. Computing device 100 may also include a power button, a volume button, and/or a conduit (e.g., a channel to funnel sound from a speaker) at a top, bottom, left, or right side of housing 102, among other components. In some examples, computing device 100 may include only one of camera 132A or 132B. For example, when display component is relatively large (e.g., covers over ⅓ of the back side 106), display component 116 may be used to display images during video conferencing while camera 132B is used to take images during video conferencing, such that computing device 100 may omit camera 132A. Including a single camera may reduce the cost and/or complexity of computing device 100.

PSD 112 may, in some examples, be a bezel-less PSD which may extend substantially to the top, bottom, left, and right edges of the front side 104 of housing 102 (e.g., within 5 millimeters (mm) or less of the respective edges of housing 102). In some examples, because PSD 112 may include a bezel-less PSD or the bezel may be very small, there may not be room for other components between PSD 112 and the edges of front side 104 of housing 102. Thus, in some examples, PSD 112 may include an aperture that includes camera 132A, a speaker, or other input or output devices. In some instances, camera 132A may be located beneath PSD 112. For instance, PSD 112 may include a transparent region and camera 132A may be located beneath the transparent region of PSD 112. In examples where housing 102 includes a very small, or no, bezel around PSD 112, components 132B, 134, 136, and 138 may be located at back side 106 of housing 102. Because PSD 112 and object detection sensor 136 may be located at different sides, a user of computing device 100 may utilize PSD 112 at front side 104 even if computing device 100 detects an object in proximity to object detection sensor 136 at back side 106.

PSD 112 and presence-sensitive input component 118 may function as presence-sensitive input devices for computing device 100. PSD 112 and presence-sensitive input component 118 may be implemented using various technologies. For instance, PSD 112 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Similarly, presence-sensitive input component 118 may function as an input device using a touchpad or presence-sensitive input screen as described above. PSD 112 and presence-sensitive input component 118 may receive tactile input from a user of computing device 100. PSD 112 and presence-sensitive input component 118 may receive indications of tactile input by detecting one or more gestures from a user (e.g., the user touching or pointing to one or more locations of PSD 112 or presence-sensitive input component 118 with a finger or a stylus pen).

PSD 112 and display component 116 may function as output devices. PSD 112 and display component 116 may function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 100. In some examples, display component 116 may consume less power than PSD 112. For example, display component 116 may be smaller than PSD 112, may use a display technology that uses less power, may not include a presence-sensitive input component, or any combination therein.

In some examples, display component 116 may be smaller than PSD 112 and may be used to display relatively small amounts of information compared to PSD 112. For instance, in response to receiving a phone call or text based notification (e.g., text message, email, etc.), computing device 100 may output a graphical user interface associated with a calling application or messaging application to display component 116 rather than PSD 112. Because display component 116 may consume less power than PSD 112 (e.g., because display component may be smaller than PSD 112), outputting a graphical user interface to display component 116 rather than PSD 112 may reduce the amount of energy consumed by computing device 100 when displaying the graphical user interface.

In some examples, computing device 100 may include one or more object detection sensors 136. Object detection sensor 136 may include a proximity sensor, infrared (IR) sensor, optical sensor (e.g., ambient light and/or image sensor), touch sensor (e.g., resistive, capacitive, acoustic, etc.), ambient temperature sensor, or any other sensor capable of detecting objects in proximity to computing device 100. In some examples, object detection sensor 136 may detect an object, generate sensor data based on the detected object, and output the sensor data. For example, when object detection sensor 136 includes a proximity sensor, object detection sensor 136 may detect an object by emitting IR light and measuring how much of the emitted IR light reflects off an object, and may generate sensor data that indicates how much of the emitted IR light was reflected back to object detection sensor 136 and/or indicates a distance between object detection sensor 136 and an object. As another example, when object detection sensor 136 includes a presence-sensitive input device, object detection sensor 136 may detect an object by measuring a capacitance and/or pressure and may generate sensor data indicative of a change in capacitance and/or pressure detected by object detection sensor 136.

In some examples, object detection sensor 136 may generate sensor data by detecting an amount of light or an ambient temperature. For example, object detection sensor 136 may include an ambient light sensor that generates sensor data indicative of an amount of light detected by the ambient light sensor, or an ambient temperature sensor that generates sensor data indicative of an ambient temperature. As another example, object detection sensor 136 may generate sensor data by capturing one or more images. For instance, object detection sensor 136 may include an image sensor that generates sensor data indicative of the images.

Computing device 100 may determine whether an object is in the proximity of computing device 100 based on the received sensor data. In some examples, computing device 100 may determine whether the object is in the proximity of computing device 100 by determining whether a value included in the sensor data satisfies a threshold value. For example, when the sensor data indicates a distance to an object, computing device 100 may determine that an object is in the proximity of computing device 100 if the distance between the object and object detection sensor 136 is less than a threshold distance. As another example, when the sensor data indicates a change in the capacitance of the object detection sensor 136, computing device 100 may determine that an object is in the proximity of computing device 100 if the change in capacitance is greater than a threshold capacitance change.

In some examples, computing device 100 may determine that the object is in the proximity of computing device 100 by monitoring the sensor data over a predefined amount of time and determining that a change in the sensor data satisfies a threshold amount of change. For example, computing device 100 may determine that an object is in the proximity of computing device 100 if the change in ambient temperature within the predefined amount of time is greater than threshold temperature change or if the change in ambient light within the predefined amount of time is greater than a threshold amount of change. As another example, when object detection sensor 136 includes an image sensor (e.g., camera 132B), the sensor data may include an indication of a plurality of images. Computing device 100 may determine that an object is in the proximity of computing device 100 if an object occupies more than a threshold number of pixels in any particular image or if the number of pixels occupied by the object changes (e.g., increases) by more than a threshold number or percentage of pixels.

Responsive to determining that an object is in the proximity of computing device 100, computing device 100 may determine whether to disable a particular presence-sensitive input device and/or display device located at a side of computing device 100 opposite object detection sensor 138. In other words, as illustrated in FIG. 1, PSD 112 may be located at front side 104, object detection sensor 136 may be located at back side 106 (e.g., back side 106 being opposite front side 104), and computing device 100 may determine whether to automatically disable PSD 112. In some examples, an object detection sensor may be located at front side 104, display component 116 and presence-sensitive input component 118 may be located at back side 106, and computing device 100 may determine whether to automatically disable display component 116 and/or presence-sensitive input component 118. For ease of illustration purposes only, computing device 100 will be described as determining whether to disable PSD 112.

In some examples, computing device may determine whether to disable PSD 112 based at least in part on sensor data generated by object detection sensor 136. For example, if computing device 100 is placed in a pocket of a user, object detection sensor 136 detects the proximity of the fabric of the pocket. Computing device 100, based on the sensor data generated by object detection sensor 146, may disable PSD 112, which may reduce unintentional inputs while computing device 100 is in the user's pocket. In other words, if computing device 100 determines that an object is in the proximity of a side of computing device 100 opposite PSD 112, computing device 100 may disable PSD 112.

In some examples, computing device 100 may more accurately determine whether to disable PSD 112 based at least in part on the sensor data generated by object detection sensor 136 and on additional information. For example, computing device 100 may determine whether to disable PSD 112 based at least in part on sensor data generated by sensor 152. In some examples, sensor 152 may include another object detection sensor (e.g., a proximity sensor, optical sensor, touch sensor, ambient temperature sensor, etc.), a motion sensor (e.g., an accelerometer, gyroscope, magnetometer, etc.), or any other type of sensor. In some instances, computing device 100 may determine that object detection sensor 136 (e.g., located at back side 106) is in the proximity of an object, and sensor 152 (e.g., a motion sensor) may generate sensor data that indicates the orientation of computing device 100. For instance, the sensor data generated by sensor 152 may indicate computing device 100 is lying flat and that the front side 104 of housing 102 is facing up (e.g., computing device 100 is lying front side up on a table). In these instances, computing device 100 may infer that front side 104 is visible by, or being used by, a user of computing device 100 and may determine to refrain from disabling PSD 112 at the front side 104. However, if computing device 100 determines that back side 106 is in the proximity of an object and the sensor data generated by the sensor 152 indicates that computing device 100 is approximately vertical (e.g., plus or minus 25 degrees from vertical), computing device 100 may infer that computing device 100 is next to a user's face and may determine to disable PSD 112.

Responsive to determining to disable PSD 112, computing device 100 may disable PSD 112 by turning off the presence-sensitive input sensors of PSD 112 to prevent computing device 100 from processing inadvertent touch inputs. In some examples, computing device 100 may disable PSD 112 by turning off the backlight of PSD 112. While the techniques of this disclosure are described within the context of determining whether to disable PSD 112, the techniques of this disclosure may be used to determine whether to disable any presence-sensitive input device and/or display device located at front side 104 of housing 102 or at back side 106 of housing 102.

Techniques of this disclosure may enable a computing device to utilize an object detection sensor to determine that an object is in the proximity of one side of the computing device and disable a particular presence-sensitive input device and/or a particular display device located the opposite side of the computing device. By disabling the presence-sensitive input device and/or display device located at a side of the computing device opposite the object detection sensor, the computing device may process fewer inadvertent touch inputs and reduce the amount of power consumed by the computing device.

Figure 2:
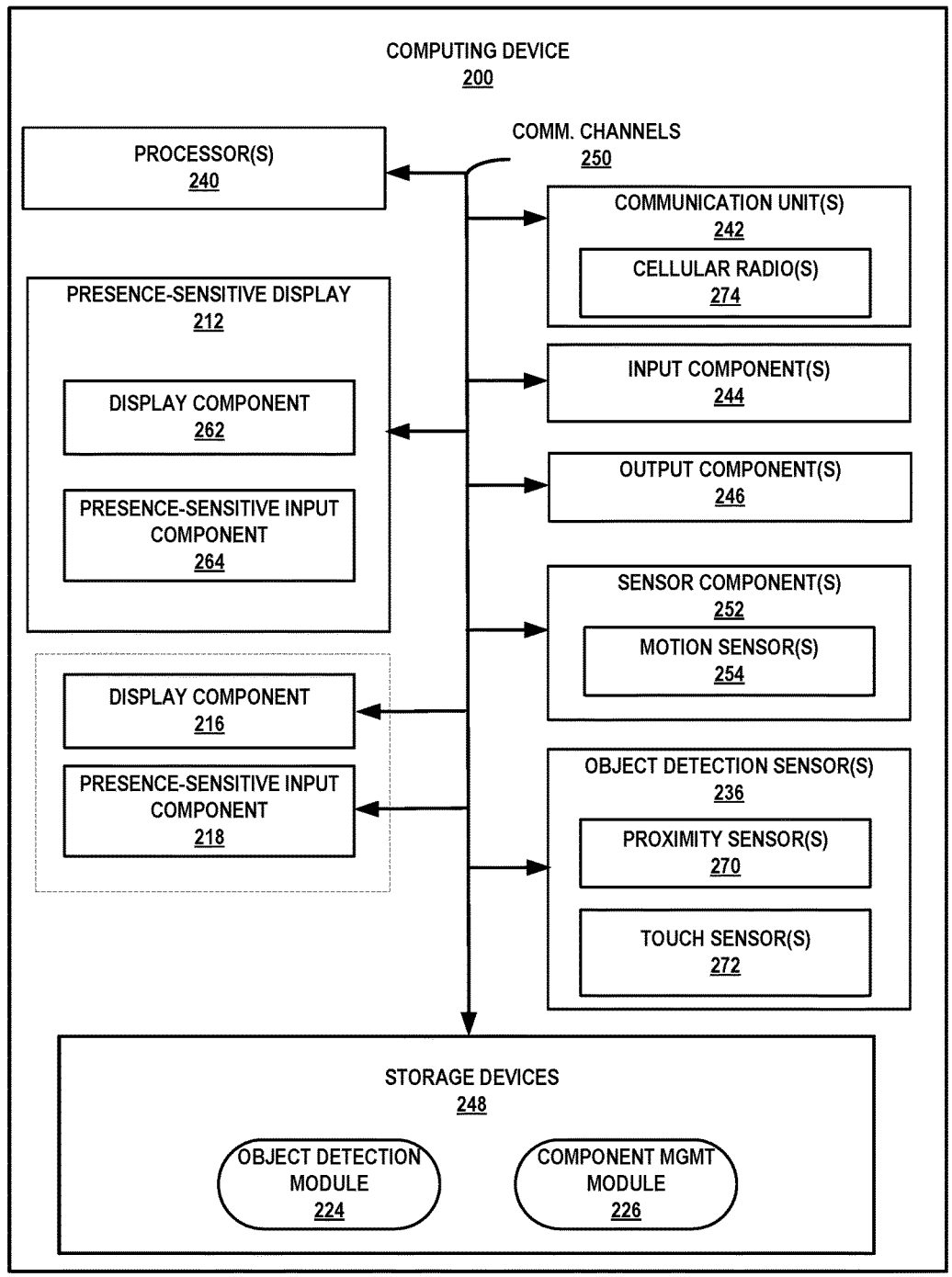
FIG. 2 is a block diagram illustrating an example computing device that is configured to individually control multiple presence-sensitive input devices and display devices of the computing device, in accordance with one or more aspects of the present disclosure.

FIG. 2 is a block diagram illustrating an example computing device that is configured to individually control multiple presence-sensitive input devices and display devices of the computing device, in accordance with one or more aspects of the present disclosure. Computing device 200 of FIG. 2 is described below as an example of computing device 100 illustrated in FIG. 1. FIG. 2 illustrates only one particular example of a computing device. Many other examples of a computing device may be used in other instances, which may include a subset of the components included in example computing device 200 or may include additional components not shown in FIG. 2.

Computing device 200 includes PSD 212, display component 216, presence-sensitive input component 218, one or more object detection sensors 236, one or more processors 240, one or more communication units 242, one or more input components 244, one or more output components 246, one or more storage components 248, and one or more sensor components 252. PSD 212 includes display component 262 and presence-sensitive input component 264. Display component 216 and presence-sensitive input component 218 may part of a single device (e.g., a presence-sensitive display) or may be separate devices. Storage components 248 of computing device 200 may include object detection module (ODM) 224 and component management module (CMM) 226. Communication channels 250 may interconnect each of the components 212, 216, 218, 236, 240, 242, 244, 246, 248, and 252 for inter-component communications (physically, communicatively, and/or operatively). In some examples, communication channels 250 may include a system bus, a network connection, an inter-process communication data structure, or any other method for communicating data.

One or more communication units 242 of computing device 200 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular radios (274), wireless network radios, as well as universal serial bus (USB) controllers.

One or more input components 244 of computing device 200 may receive input. Examples of input are tactile, audio, and video input. Input components 242 of computing device 200, in one example, includes a presence-sensitive input device (e.g., a touch sensitive screen, a PSD), mouse, keyboard, voice responsive system, video camera, microphone, or any other type of device for detecting input from a human or machine.

One or more output components 246 of computing device 100 may generate output. Examples of output are tactile, audio, and video output. Output components 246 of computing device 200, in one example, includes a presence-sensitive display, sound card, video graphics adapter card, speaker, cathode ray tube (CRT) monitor, liquid crystal display (LCD), or any other type of device for generating output to a human or machine.

Display components 216 and 262 may each include one or more screens at which information is displayed. For example, display components 216 and 262 may include one or more LCD displays, LED displays, e-ink displays, etc. Display components 216 and 262 may each output information to a user in the form of a user interface, which may be associated with functionality provided by computing device 200. For example, display components 216 and 262 may output various graphical user interfaces of associated with computing platforms, operating systems, applications, or services executing at or accessible by computing device 200 (e.g., a message application, a navigation application, an Internet browser application, a mobile operating system, etc.). In some instances, computing device 200 may output graphical user interfaces associated based on the amount of content to display and/or the amount of power used to display the content. For example, display component 216 may be smaller and may consume less power than display component 262. For instance, in examples where display component 262 is bigger than display component 216, display component 262 may output a graphical user interface associated with a multimedia application (e.g., a video application) in order to display more content. However, in some instances, display component 216 (e.g., rather than display component 262) may output a graphical user interface associated with a phone application in to reduce the amount of power used by computing device 200 while displaying the graphical user interface associated with the phone application.

Presence-sensitive input component 264 may detect an object at or near a front side of computing device 200 (e.g., at or near display component 262). Similarly, presence-sensitive input component 218 may detect an object at or near a back side of computing device 200. As one example range, presence-sensitive input components 218 and 264 may detect an object, such as a finger or stylus that is within two inches or less of the respective sides at which the presence-sensitive input components 218 and 264 are located. Presence-sensitive input components 218 and 264 may determine a location (e.g., an [x, y] coordinate) of computing device 200 at which the object was detected. In another example range, presence-sensitive input components 218 and 264 may detect an object six inches or less from a side of computing device 200 and other ranges are also possible. Presence-sensitive input components 218 and 264 may determine a location selected using an input device (e.g., a user's finger) using capacitive, inductive, and/or optical recognition techniques. In some examples, presence-sensitive input components 218 and 264 also provide output to a user using tactile, audio, or video stimuli. Presence-sensitive input component 264 of PSD 212 and presence-sensitive input component 218 may receive tactile input from a user of computing device 200. Presence-sensitive input components 218 and 264 may receive indications of the tactile input by detecting one or more tap or non-tap gestures from a user of computing device 200 (e.g., the user touching or pointing to one or more locations of PSD 212 with a finger or a stylus pen).

Presence-sensitive input components 218 and 264 of computing device 200 may detect two-dimensional and/or three-dimensional gestures as input from a user of computing device 200. For instance, one or both of presence-sensitive input components 218 and 264 may include a sensor that may detect a user's movement (e.g., moving a hand, an arm, a pen, a stylus, etc.) within a threshold distance of the sensor. Presence-sensitive input components 218 and 264 may determine a two-dimensional or three-dimensional vector representation of the movement and correlate the vector representation to a gesture input (e.g., a hand-wave, a pinch, a clap, a pen stroke, etc.) that has multiple dimensions.

One or more processors 240 may implement functionality and/or execute instructions associated with computing device 200. Examples of processors 240 include application processors, display controllers, auxiliary processors, one or more sensor hubs, and any other hardware configure to function as a processor, a processing unit, or a processing device. Modules 224 and 226 may be operable by processors 240 to perform various actions, operations, or functions of computing device 200. For example, processors 240 of computing device 200 may retrieve and execute instructions stored by storage components 248 that cause processors 240 to perform the operations of modules 224 and 226. The instructions, when executed by processors 240, may cause computing device 200 to store information within storage components 248.

One or more storage components 248 within computing device 200 may store information for processing during operation of computing device 200 (e.g., computing device 200 may store data accessed by modules 224 and 226 during execution at computing device 200). In some examples, storage component 248 is a temporary memory, meaning that a primary purpose of storage component 248 is not long-term storage. Storage components 248 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 224 and 226. Storage components 248 may include a memory configured to store data or other information associated with modules 224 and 226.

In some examples, computing device 200 includes one or more object detection sensors 236. Object detection sensors 236 may include a proximity sensor 270, IR sensor, optical sensor (e.g., an image sensor, an ambient light sensor, etc.), touch sensor 272 (e.g., presence-sensitive input component 264 or 218), ambient temperature sensor, or any other sensor configured to detect an object in the proximity of computing device 200. The one or more object detection sensors 236 may be located at one or more sides (e.g., front, back, top, bottom, left, and/or right side) of computing device 200. At least one of the one or more object detection sensors 236 may be located at a side of computing device 200 that is opposite a side of computing device 200 that includes display component 216 and presence-sensitive input component 218 or display component 262 and presence-sensitive input component 264.

In some examples, object detection sensor 236 may detect an object, generate sensor data based on the detected object, and output the sensor data. In some instances, the sensor data generated by object detection sensor 236 may be indicative of a distance between object detection sensor 236 and an object. In another instance, the sensor data may be indicative of a change in capacitance and/or pressure detected by object detection sensor 236. The sensor data sensor may, in some instances, be indicative of an amount of ambient light or ambient temperature. In yet another instance, the sensor data may be indicative of one or more images taken by object detection sensor 236. In response to generating the sensor data, object detection sensor 236 may output the sensor data.

ODM 224 may receive the sensor data and may determine, based at least in part on the sensor data, whether an object is in the proximity of computing device 200. For example, ODM 224 may receive sensor data from object detection sensor 236 and may determine that an object is in the proximity of the computing device if a value indicated by the sensor data satisfies the threshold value. In some examples where the sensor data indicates a distance between an object and object detection sensor 23, ODM 224 may compare the distance to a threshold distance. ODM 224 may determine that the object is in the proximity of a side of computing device 200 if the distance between the object and object detection sensor 236 is less than the threshold distance. In examples where the sensor data indicates a change in capacitance, ODM 224 may determine that an object is in the proximity of object detection sensor 236 in response to determining that the change in capacitance is greater than a threshold change. As another example, where object detection sensor 236 includes an image sensor and the sensor data includes one or more images, ODM 224 may determine that an object is in the proximity of computing device 200 in response to determining that an object occupies more than a threshold number of pixels in any particular image.

In some examples, ODM 224 may determine whether an object is in the proximity of a side of computing device 200 by determining a change in the sensor data. For example, ODM 224 may determine that an object is in the proximity of computing device 200 if the change in the sensor data satisfies a threshold amount of change within a predefined amount of time. In examples where the sensor data includes a plurality of images taken within a predetermined amount of time, ODM 224 may determine that an object is in the proximity of computing device 200 if the number of pixels occupied by the object changes (e.g., increases) by more than a threshold amount. As another example, when object detection sensor 236 includes an ambient temperature sensor, the sensor data may indicate the temperature in the proximity of computing device 200 and a large change in the ambient temperature may indicate that a user picked up computing device 200. In such examples, ODM 224 may determine that an object is in the proximity of computing device 200 in response to determining that the ambient temperature increased by more than a threshold amount (e.g., from 70 degrees Fahrenheit to 95 degrees Fahrenheit) within a predefined period of time (e.g., 1 second). In examples where object detection sensor 236 includes an ambient light sensor, a large change in the ambient light may indicate that an object has moved near the ambient light sensor and is blocking light to the ambient light sensor. ODM 224 may determine that an object is in the proximity of computing device 200 in response to determining that the amount of light detected by object detection sensor 236 changed (e.g., decreased) by more than a threshold amount.

Responsive to determining that an object is in the proximity of computing device 200, CMM 226 may determine whether to disable a display component and/or a presence-sensitive input component that is located on a side of computing device 200 that is opposite object detection sensor 236. For example, display component 262 and presence-sensitive input component 264 may be located at a front side of computing device 200 and object detection sensor 236 may be located at a back side of computing device 200. As another example, display component 216 and presence-sensitive input component 218 may be located at the back side of computing device 200 and computing device 200 may include an object detection sensor (e.g., presence-sensitive input component 264 may function as an object detection sensor) at the front side. For purposes of illustration only, CMM 226 is described as determining whether to disable at least part of PSD 212 (e.g., display component 262, presence-sensitive input component 264, or both). However, it is to be understood that CMM 226 may determine whether to disable display component 216 and/or presence-sensitive input component 218.

In some examples, CMM 226 may determine whether to disable at least part of PSD 212 based on the proximity of an object to computing device 200. For example, in some instances, CMM 226 may determine to disable at least part of PSD 212 in response to determining that an object is in the proximity of computing device 200. In other words, if ODM 224 determines that an object is close enough to computing device 200, CMM 226 may disable at least part of PSD 212.

In some examples, CMM 226 may more accurately determine whether to disable at least part of PSD 212 based at least in part on additional information, such as sensor data generated by one or more sensor components 252. Sensor components 252 include one or more location sensors (GPS components, Wi-Fi components, cellular components), ambient temperature sensors, motion sensors 254 (e.g., accelerometers, gyros, magnetometers, etc.), pressure sensors (e.g., barometer), ambient light sensors, physiological sensors (e.g., heart rate sensors, galvanic skin sensors, etc.), and other sensors (e.g., microphone, camera, infrared proximity sensor, and the like). Other sensors may include glucose sensor, hygrometer sensor, olfactory sensor, compass sensor, step counter sensor, to name a few other non-limiting examples.

CMM 226 may determine whether to disable display component 262 and/or presence-sensitive input component 264 of PSD 212 based on at least in part on sensor data generated by one or more motion sensors 254. For example, the sensor data from motion sensors 254 may indicate an orientation of computing device 200. In some instances, if the sensor data from object detection sensor 236 indicates back side 106 of computing device 200 is in the proximity of an object and the sensor data from motion sensors 254 indicates computing device 200 is vertical or approximately vertical (e.g., within approximately 25 degrees of vertical), this may indicate that back-side 106 of computing device 200 is in the proximity of a user's head and that the user is unlikely to intentionally enter inputs at presence-sensitive input component 264 or view display component 262. Thus, CMM 226 may determine to disable at least part of PSD 212. However, if the sensor data from object detection sensor 236 indicates back side 106 of computing device 200 is in the proximity of an object and the sensor data from motion sensors 254 indicates computing device 200 is lying flat and that front side 104 is facing up, this may indicate that back side 106 is lying on an object (e.g., a table) and that front side 104 may be intentionally used to enter touch inputs. Thus, CMM 226 may determine to refrain from disabling display component 262 and presence-sensitive input component 264.

In some examples, CMM 226 may determine whether to disable at least part of PSD 212 based at least in part on sensor data generated by a first type of object detection sensor (e.g., proximity sensor 270) and a second, different type of object detection sensor (e.g., touch sensors 272). In some instances, proximity sensor 270 and touch sensor 272 may be located at the same side (e.g., the back side) of computing device 200. In some instances, computing device 200 may include different types of object detection sensors 236 on different sides of the computing device. In examples where two different types of object detection sensors 236 each indicate than an object is in proximity to computing device 200 (e.g., at least one of which may be on back side of computing device 200), this may indicate that PSD 212 (e.g., on the front side) is not likely to be intentionally used by a user of computing device 200. For instance, if the sensor data generated by proximity sensor 270 and touch sensor 272 both indicate that an object is in the proximity of computing device 200, this may indicate that the back side computing device 200 is near the user's head and that the user is unlikely to intentionally utilize PSD 212. In response to receiving indications from both proximity sensor 270 and touch sensor 272 that an object is in the proximity of computing device 200, CMM 226 may determine to disable at least part of PSD 212. However, if the sensor data received from proximity sensor 270 indicates that an object is in the proximity of computing device 200 and the sensor data received from touch sensor 272 does not indicate that an object is in the proximity of computing device 200 (or vice versa), CMM 226 may not infer whether PSD 212 can be used and/or viewed by a user of computing device 200. As a result, CMM 200 may determine to refrain from disabling display component 262 and presence-sensitive input component 264 of PSD 212. By utilizing the data generated by two or more different types of sensors, in some examples, CMM 226 may more accurately determine whether to disable at least part of PSD 212. In other words, utilizing different types of sensors may reduce the probability of disabling part of PSD 212 while the user is viewing or utilizing PSD 212.

In some examples, CMM 226 may determine whether to disable at least part of PSD 212 based at least in part on sensor data generated by two or more object detection sensors located on different sides of computing device 200. The two or more object detection sensors 236 may be the same type of object detection sensor 236 or may be different types of object detection sensors 236. For example, computing device 200 may include a first proximity sensor 270 on the back side of computing device 200 and a second proximity sensor 270 on a different side (e.g., a bottom side) of the computing device. In examples where two object detection sensors located at different sides of computing device 200 each generate sensor data indicating an object is in proximity to computing device 200, this may indicate that PSD 212 is not likely to be intentionally used by a user of computing device 200. Responsive to receiving an indication that one or more objects are in the proximity of both proximity sensors 270, CMM 226 may determine to disable at least part of PSD 212. However, if CMM 226 receives an indication that an object is in the proximity of only one of proximity sensors 270, CMM 226 may determine to refrain from disabling display component 262 and presence-sensitive input component 264 of PSD 212.

CMM 226 of computing device 200 may determine whether to disable at least part of PSD 212 based at least in part on contextual information. As used throughout the disclosure, the term "contextual information" is used to describe information that can be used by computing device 200 to define one or more environmental characteristics associated with computing device 200 and/or users of computing device 200. In other words, contextual information represents any data that can be used by computing device 200 to determine a "user context" indicative of the circumstances that form the experience the user undergoes (e.g., virtual and/or physical) for a particular location at a particular time. Examples of contextual information include degrees of movement, magnitudes of change associated with movement, patterns of movement, application usage, calendar information, and the like. Contextual information may also include communication information such as information derived from e-mail messages, text messages, voice mail messages or voice conversations, calendar entries, task lists, social media network related information, and any other information about a user or computing device that can support a determination of a user context.

When computing device 200 stores contextual information associated with individual users or when the information is genericized across multiple users, all personally-identifiable-information such as name, address, telephone number, and/or e-mail address linking the information back to individual people may be removed before being stored. Computing device 200 may further encrypt the information to prevent access to any information stored therein. In addition, computing device 200 may only store information associated with users of computing device 200 if those users affirmatively consent to such collection of information. Computing device 200 may further provide opportunities for users to withdraw consent and in which case, computing device 200 may cease collecting or otherwise retaining the information associated with that particular user.

CMM 226 may determine whether to disable at least part of PSD 212 based at least in part on contextual information, such as a type of application currently being executed by computing device 200. For example, if ODM 224 determines that object detection sensor 236 is in the proximity of an object and the contextual information indicates that the type of an application currently executing at computing device 200 is a multimedia application (e.g., PSD 212 is currently displaying a graphical user interface associated with a multimedia application, such as a video application), CMM 226 may infer that a user of computing device 200 may intentionally utilize PSD 212. As a result, CMM 226 may determine to refrain from disabling PSD 112. In contrast, in instances where ODM 224 determines that object detection sensor 236 is in the proximity of an object and the type of an application currently executing at computing device 200 is a fitness application (e.g., an activity tracking application), this may indicate that the user is jogging and the back side of computing device 200 is proximate to the user's person, such that the user is not likely to intentionally utilize PSD 212 at the front side of computing device 200. As a result, CMM 226 may determine to disable PSD 112.

In some examples, the contextual information may indicate a current status of an application currently being executed by computing device 200. For example, the contextual information associated with a phone application may indicate whether the status of a phone application includes the use of speaker phone. In some instances, if ODM 224 determines that the back side of computing device 200 (e.g., back side 104 as illustrated in FIG. 1) is in the proximity of an object and the contextual information indicates that the status of the phone application involves the use of speaker phone, CMM 226 may infer that PSD 212 (e.g., on the front side of computing device 200) may be visibly and/or utilized by a user of computing device 200. Thus, CMM 226 may refrain from disabling either display component 262 or presence-sensitive input component 264 of PSD 212. On the other hand, if ODM 224 determines that the back side of computing device 200 is in the proximity of an object, a phone application is currently executing at computing device 200, and the contextual information indicates that the status of the phone application does not involve the use of speaker phone. Thus, CMM 226 may determine to disable at least part of PSD 212.

Responsive to determining to disable at least part of PSD 212, CMM 226 may disable display component 262, presence-sensitive input component 264, or both. In some instances, CMM 226 may disable display component 262 by turning off a backlight of display component 262 such that display component 262 does not display a graphical user interface. In some instances, CMM 226 may disable presence-sensitive input components 264 in order to prevent presence-sensitive input components 264 from processing touch inputs.

In some examples, cellular radio components 274 may include one or more cellular radio antennas. CMM 226 may adjust at least one parameter of the one or more radio antennas in response to determining whether to disable a particular presence-sensitive input component. The at least one parameter of the radio antennas may include an output power, antenna configuration, radio band, etc. In some examples, CMM 226 may adjust at least one antenna parameter in response to determining to disable a particular presence-sensitive input component. For example, if CMM 226 determines that an object is in the proximity of the back of computing device 200 and that CMM 226 should disable presence-sensitive input component 264 (e.g., when the back side is in the proximity of the user's head), CMM 226 may change the power output by the cellular radio antennas or change the number of antennas used to send and receive cellular radio signals.

In some examples, CMM 226 may adjust at least one antenna parameter in response to determining not to disable the presence-sensitive input component. In some instances, CMM 226 may adjust the at least one parameter based on the whether the particular presence-sensitive input component that is not disabled is the first presence-sensitive input component or the second presence-sensitive input component. For example, if CMM 226 determines that an object is in the proximity of the back side of computing device 200 but that CMM 226 should not disable presence-sensitive input component 264 (e.g., because a user is consuming media via PSD 212), CMM 226 may change the frequency band over which data is transmitted (e.g., to a higher frequency band), which may improve data reception (e.g., increased data speeds). As another example, if CMM 226 determines that an object is in the proximity of the front side of computing device 200 but that CMM 226 should not disable presence-sensitive input component 218 (e.g., because a user is utilizing presence-sensitive input component 218 to enter a phone number), CMM 226 may change the frequency band (e.g., to a lower band), which may improve cellular reception (e.g., by allowing the radio waves to travel farther).

Figure 3:
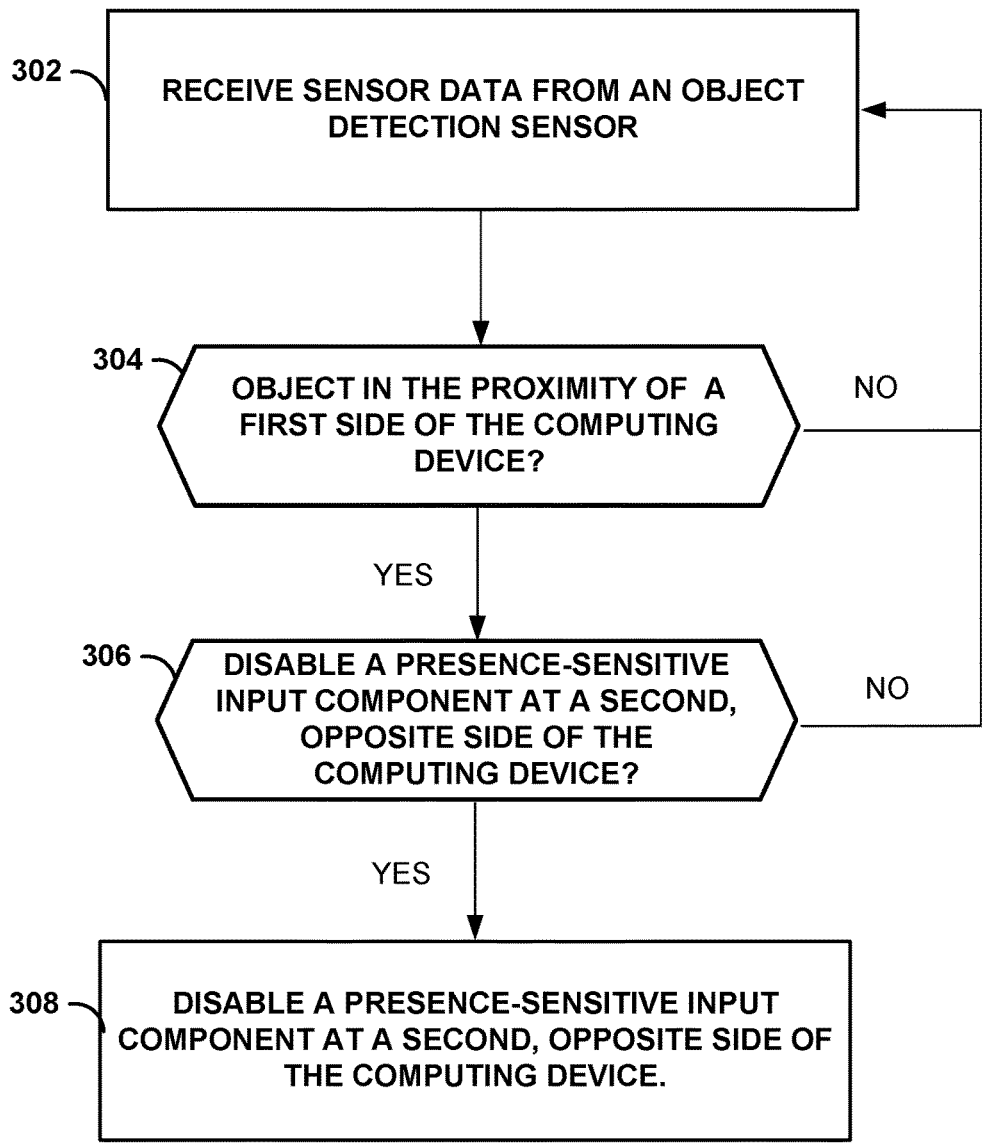
FIG. 3 is a flowchart illustrating example operations of a computing device that is configured to individually control multiple presence-sensitive input devices and display devices of the computing device, in accordance with one or more aspects of the present disclosure.

FIG. 3 is a flowchart illustrating example operations of a computing device that is configured to individually control multiple presence-sensitive input devices and display devices of the computing device, in accordance with one or more aspects of the present disclosure. The process of FIG. 3 may be performed by one or more processors of a computing device, such as computing devices 100 and 200, as illustrated in FIGS. 1 and 2, respectively. For purposes of illustration only, FIG. 3 is described below within the context of computing device 200 of FIG. 2.

ODM 224 of computing device 200 may receive sensor data from at least one object detection sensor 236 (302). For example, object detection sensor 236 may include a proximity sensor 270, IR sensor, optical sensor (e.g., an image sensor, an ambient light sensor, etc.), touch sensor 272 (e.g., presence-sensitive input component 264 or 218), ambient temperature sensor, or any other sensor configured to detect an object in the proximity of computing device 200. Object detection sensor 236 may generate sensor data that may be indicative of a distance between object detection sensor 236 and an object, a change in capacitance, an amount of ambient light, an ambient temperature, one or more images, to name a few examples.

ODM 224 may determine whether an object is in the proximity of a first side of computing device 200 (304). In some examples, ODM 224 may determine whether an object is in the proximity of computing device 200 by determining whether a value indicated by the sensor data satisfies a threshold value. For example, ODM 224 may determine that the value indicated by the sensor data satisfies the threshold if a distance indicated by the sensor data is less than a threshold distance or a capacitance change indicated by the sensor data is greater than a threshold change. In some examples, ODM 224 may determine whether an object is in the proximity of computing device 200 by determining whether a change in the sensor data satisfies a threshold amount of change within a predetermined amount of time. For example, ODM 224 may determine that a change in the sensor data satisfies a threshold amount of change if a change in the ambient light or ambient temperature increases by more than a threshold amount. As another example, ODM 224 may determine that a change in the sensor data satisfies a threshold amount of change if the sensor data includes a plurality of images and the number of pixels occupied by an object increases by more than a threshold amount.

In response to determining that an object is not in the proximity of the first side of computing device 200 ("NO" branch of 304), ODM 224 may wait to receive additional sensor data from object detection sensor 236 (302). Computing device 200 may continue to output graphical user interfaces, process inputs, and perform other operations as normal. For example, computing device 200 may refrain from disabling PSD 212, display component 216, and/or presence-sensitive input component 218. That is, in response to determining that an object is not in the proximity of computing device 200, computing device 200 may not disable PSD 212, display component 216, and/or presence-sensitive input component 218.

In response to determining that an object is in the proximity of the first side of computing device 200 ("YES" branch of 304), CMM 226 may determine whether to disable a presence-sensitive input component 218 or 264 located at a second, opposite side of the computing device 200 (306). Additionally, or alternatively, CMM 226 may determine whether to disable a display component located at the second, opposite side of computing device 200. In some examples, if object detection sensor 236 is located at a back side of computing device 200 and presence-sensitive input component 264 of PSD 212 is located at the front side of computing device 200, CMM 226 may determine whether to disable presence-sensitive input component 264. In some examples, CMM 226 may determine to disable presence-sensitive input component 264 any time ODM 224 determines an object is in the proximity of computing device 200. CMM 226 may determine whether to disable presence-sensitive input component based at least in part on sensor data from one or more additional sensors (e.g., a second object detection sensor, a motion sensor, or other sensor) and/or contextual information. For example, motion sensor 254 may generate sensor data indicative of the orientation of computing device 200. CMM 226 may determine whether to disable presence-sensitive input component 264 based at least in part on the orientation of computing device 200. For instance, if the sensor data indicates that computing device 200 is approximately vertical (e.g., within approximately 25 degrees of vertical) and ODM 224 determines that an object is in the proximity of the back side of computing device 200, CMM 226 may determine to disable presence-sensitive input component 264.

If CMM 226 determines to refrain from disabling the presence-sensitive input device 264 or 218 at the second, opposite side of computing device 200 ("NO" branch of 306), CMM may wait to receive additional sensor data from object detection sensor 236 (302). For example, computing device 200 may refrain from disabling a presence-sensitive input component or display component. In other words, if CMM 226 determines to refrain from disabling presence-sensitive input device 264 and/or 218, computing device 200 may not disable presence-sensitive input device 264 and/or 218. Thus, computing device 200 may continue displaying graphical user interfaces at the display component and processing inputs received at the presence-sensitive input component.

In response to determining to disable the presence-sensitive input device 264 or 218 at the second, opposing side of computing device 200 ("YES" branch of 306), CMM 226 may disable the presence-sensitive input device 264 or 218 at the second side of computing device 200 that is opposite from the first side of computing device 200 (308). Continuing the example above where object detection sensor 236 is located at a back side of computing device 200 and presence-sensitive input component 264 of PSD 212 is located at the front side of computing device 200, CMM 226 may disable presence-sensitive input component 264 in response to determining to disable presence-sensitive input component 264. In some instances, CMM 226 may disable presence-sensitive input component 264 by turning off the presence-sensitive input sensors, which may prevent computing device 200 from processing inadvertent touch inputs. Additionally, or alternatively, CMM 226 may disable display component 262 by turning off a backlight of display component 262.

The following numbered examples may illustrate one or more aspects of the disclosure:

Example 1

A computing device comprising: a housing comprising a front side and a back side; a first presence-sensitive input component located at the front side of the housing; a second presence-sensitive input component located at the back side of the housing; at least one object detection sensor configured to generate sensor data; at least one processor; and a memory comprising instructions that, when executed by the at least one processor, cause the at least one processor to: determine, based on the sensor data whether an object is in the proximity of the computing device; responsive to determining that the object is in the proximity of the computing device, determine whether to disable a particular presence-sensitive input component located at a side of the housing opposite the at least one object detection sensor, wherein the particular presence-sensitive input component includes one of the first presence-sensitive input component or the second presence-sensitive input component; and responsive to determining to disable the particular presence-sensitive input component located at the side of the housing opposite the at least one object detection sensor, disable the particular presence-sensitive input component.

Example 2

The computing device of example 1, wherein the sensor data comprises first sensor data, the computing device further comprising: a second sensor configured to generate second sensor data, wherein the instructions that cause the at least one processor to determine whether to disable the particular presence-sensitive input component cause the at least one processor to determine whether to disable the particular presence-sensitive input component based at least in part on the second sensor data.

Example 3

The computing device of example 2, wherein the second sensor includes a motion sensor configured to detect an orientation of the computing device, wherein the second sensor data comprises an indication of the orientation of the computing device, and wherein the instructions that cause the at least one processor to determine whether to disable the particular presence-sensitive input component cause the at least one processor to determine whether to disable the particular presence-sensitive input component based at least in part on the orientation of the computing device.

Example 4

The computing device of any combination of examples 2-3, wherein the second sensor and the object detection sensor are located at the same side of the housing.

Example 5

The computing device of example 4, wherein the object detection sensor comprises a first object detection sensor, and wherein the second sensor comprises a second object detection sensor.

Example 6

The computing device of example 5, wherein the first object detection sensor includes a first type of object detection sensor and the second object detection sensor includes a second, different type of object detection sensor.

Example 7

The computing device of any combination of examples 1-6, wherein the instructions that cause the at least one processor to determine whether to disable the particular presence-sensitive input component cause the at least one processor to determine whether to disable the particular presence-sensitive input component based at least in part on contextual information.

Example 8

The computing device of example 7, wherein the contextual information includes at least one of the following: a type of an application currently being executed by the computing device; or a current status of the application currently being executed by the computing device.

Example 9

The computing device of any combination of examples 1-8, wherein the object detection sensor includes a proximity sensor, wherein the sensor data includes a distance between the proximity sensor and the object, and wherein the instructions cause the at least one processor to determine whether the object is proximate to the computing device by causing the at least one processor to determine whether the distance between the proximity sensor and the object is less than a threshold distance.

Example 10

The computing device of any combination of examples 1-9, wherein the object detection sensor includes an optical sensor, wherein the sensor data indicates an amount of light received by the optical sensor, and wherein the instructions cause the at least one processor to determine whether the object is proximate to the computing device by causing the at least one processor to determine whether a change in the amount of light received by the computing device is greater than a threshold amount of change.

Example 11

The computing device of any combination of examples 1-10, further comprising at least one cellular radio including one or more cellular radio antennas, wherein the memory comprises additional instructions that, when executed by the at least one processor, cause the at least one processor to: responsive to determining not to disable the particular presence-sensitive input component, adjust, based on the whether the particular presence-sensitive input component is the first presence-sensitive input component or the second presence-sensitive input component, at least one parameter of the one or more cellular radio antennas.

Example 12

A method comprising: determining, by a computing device, based on sensor data generated by at least one object detection sensor, whether an object is in the proximity of the computing device, wherein the computing device includes a housing comprising a front side and a back side, wherein the computing device includes a first presence-sensitive input component located at the front side of the housing, and wherein the computing device includes a second presence-sensitive input component located at the back side of the housing; responsive to determining that the object is in the proximity of the computing device, determining, by the computing device, whether to disable a particular presence-sensitive input component located at a side of the housing opposite the at least one object detection sensor, wherein the particular presence-sensitive input component includes one of the first presence-sensitive input component or the second presence-sensitive input component; and responsive to determining to disable the particular presence-sensitive input component located at the side of the housing opposite the at least one object detection sensor, disabling the particular presence-sensitive input component.

Example 13

The method of example 12, wherein the sensor data comprises first sensor data, the method further comprising: receiving, from a second sensor of the computing device, second sensor data, wherein determining whether to disable the particular presence-sensitive input component comprises determining whether to disable the particular presence-sensitive input component based at least in part on the second sensor data.

Example 14

The method of example 13, wherein the second sensor data comprises an orientation of the computing device, and wherein determining whether to disable the particular presence-sensitive input component comprises determining whether to disable the particular presence-sensitive input component based at least in part on the orientation of the computing device.

Example 15

The method of any combination of examples 13-14, wherein the second sensor and the object detection sensor are located at the same side of the housing.

Example 16

The method of example 15, wherein the object detection sensor comprises a first object detection sensor, and wherein the second sensor comprises a second object detection sensor.

Example 17

The method of example 16, wherein the first object detection sensor includes a first type of object detection sensor and the second object detection sensor includes a second, different type of object detection sensor.

Example 18

The method of any combination of examples 12-17, wherein determining whether to disable the particular presence-sensitive input component comprises determining whether to disable the particular presence-sensitive input component based at least in part on contextual information.

Example 19

The method of example 18, wherein the contextual information includes at least one of the following: a type of an application currently being executed by the computing device; or a current status of the application currently being executed by the computing device.

Example 20

A non-transitory computer-readable storage medium encoded with instructions that, when executed by at least one processor of a computing device, cause the at least one processor to: determine, based on sensor data generated by at least one object detection sensor, whether an object is in the proximity of the computing device, wherein the computing device includes a housing comprising a front side and a back side, wherein the computing device includes a first presence-sensitive input component located at the front side of the housing, and wherein the computing device includes a second presence-sensitive input component located at the back side of the housing; responsive to determining that the object is in the proximity of the computing device, determine, whether to disable a particular presence-sensitive input component located at a side of the housing opposite the at least one object detection sensor, wherein the particular presence-sensitive input component includes one of the first presence-sensitive input component or the second presence-sensitive input component; and responsive to determining to disable the particular presence-sensitive input component located at the side of the housing opposite the at least one object detection sensor, disable the particular presence-sensitive input component.

Example 21

The non-transitory computer-readable storage medium of example 20, wherein the sensor data comprises first sensor data, comprising additional instructions that, when executed by the at least one processor, cause the at least one processor to: receive, from a second sensor of the computing device, second sensor data, wherein the instructions that cause the at least one processor to determine whether to disable the particular presence-sensitive input component cause the at least one processor to determine whether to disable the particular presence-sensitive input component based at least in part on the second sensor data.

Example 22

A system comprising means for performing any of the methods of examples 12-19.

Example 23

A computer-readable medium encoded with instructions for causing one or more processors of a computing device to perform any of the methods of examples 12-19.

Example 24

A device comprising means for performing any of the method of examples 12-19.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A computing device comprising:
a housing comprising a front side and a back side;
a first presence-sensitive input component located at the front side of the housing;
a second presence-sensitive input component located at the back side of the housing;
an object detection sensor configured to generate sensor data;
at least one processor; and
a memory comprising instructions that, when executed by the at least one processor, cause the at least one processor to:

determine, based on the sensor data, whether an object is in the proximity of the computing device;

responsive to determining that the object is in the proximity of the computing device, determine, based at least in part on sensor data generated by a different sensor or contextual information, whether to disable a particular presence-sensitive input component located at a side of the housing opposite the object detection sensor, wherein the particular presence-sensitive input component includes one of the first presence-sensitive input component or the second presence-sensitive input component; and responsive to determining to disable the particular presence-sensitive input component located at the side of the housing opposite the at least one object detection sensor, disable the particular presence-sensitive input component.

2. The computing device of claim 1, wherein:

the different sensor includes a motion sensor configured to detect an orientation of the computing device, the sensor data generated by the different sensor comprises an indication of the orientation of the computing device, and the instructions that cause the at least one processor to determine whether to disable the particular presence-sensitive input component cause the at least one processor to determine whether to disable the particular presence-sensitive input component based at least in part on the orientation of the computing device.

3. The computing device of claim 1, wherein the different sensor and the object detection sensor are located at the same side of the housing.

4. The computing device of claim 3, wherein:

the object detection sensor comprises a first object detection sensor, and the different sensor comprises a second object detection sensor.

5. The computing device of claim 4, wherein the first object detection sensor includes a first type of object detection sensor and the second object detection sensor includes a second, different type of object detection sensor.

6. The computing device of claim 1, wherein the contextual information includes at least one of the following:

a type of an application currently being executed by the computing device; or or a current status of the application currently being executed by the computing device.

7. The computing device of claim 1, wherein:

the object detection sensor includes a proximity sensor, wherein the sensor data includes a distance between the proximity sensor and the object, and the instructions cause the at least one processor to determine whether the object is proximate to the computing device by causing the at least one processor to determine whether the distance between the proximity sensor and the object is less than a threshold distance.

8. The computing device of claim 1, wherein:

the object detection sensor includes an optical sensor, wherein the sensor data indicates an amount of light received by the optical sensor, and wherein the instructions cause the at least one processor to determine whether the object is proximate to the computing device by causing the at least one processor to determine whether a change in the amount of light received by the computing device is greater than a threshold amount of change.

9. The computing device of claim 1, further comprising:

at least one cellular radio including one or more cellular radio antennas, wherein the memory comprises additional instructions that, when executed by the at least one processor, cause the at least one processor to, responsive to determining not to disable the particular presence-sensitive input component, adjust, based on the whether the particular presence-sensitive input component is the first presence-sensitive input component or the second presence-sensitive input component, at least one parameter of the one or more cellular radio antennas.

10. A method comprising:

determining, by a computing device, based on sensor data generated by an object detection sensor, whether an object is in the proximity of the computing device, wherein the computing device includes a housing comprising a front side and a back side, wherein the computing device includes a first presence-sensitive input component located at the front side of the housing, and wherein the computing device includes a second presence-sensitive input component located at the back side of the housing;

responsive to determining that the object is in the proximity of the computing device, determining, by the computing device, based at least in part on sensor data generated by a different sensor or contextual information, whether to disable a particular presence-sensitive input component located at a side of the housing opposite the object detection sensor, wherein the particular presence-sensitive input component includes one of the first presence-sensitive input component or the second presence-sensitive input component; and responsive to determining to disable the particular presence-sensitive input component located at the side of the housing opposite the at least one object detection sensor, disabling the particular presence-sensitive input component.

11. The method of claim 10, wherein:

the sensor data generated by the different sensor comprises an indication of an orientation of the computing device, and determining whether to disable the particular presence-sensitive input component comprises determining whether to disable the particular presence-sensitive input component based at least in part on the orientation of the computing device.

12. The method of claim 10, wherein the different sensor and the object detection sensor are located at the same side of the housing.

13. The method of claim 12, wherein:

the object detection sensor comprises a first object detection sensor, and the different sensor comprises a second object detection sensor.

14. The method of claim 13, wherein the first object detection sensor includes a first type of object detection sensor and the second object detection sensor includes a second, different type of object detection sensor.

15. The method of claim 10, wherein the contextual information includes at least one of the following:

a type of an application currently being executed by the computing device; or or a current status of the application currently being executed by the computing device.

16. A non-transitory computer-readable storage medium encoded with instructions that, when executed by at least one processor of a computing device, cause the at least one processor to:
- determine, based on sensor data generated by an object detection sensor, whether an object is in the proximity of the computing device, wherein the computing device includes a housing comprising a front side and a back side, wherein the computing device includes a first presence-sensitive input component located at the front side of the housing, and wherein the computing device includes a second presence-sensitive input component located at the back side of the housing;
- responsive to determining that the object is in the proximity of the computing device, determine, based at least in part on sensor data generated by a different sensor or contextual information, whether to disable a particular presence-sensitive input component located at a side of the housing opposite the object detection sensor, wherein the particular presence-sensitive input component includes one of the first presence-sensitive input component or the second presence-sensitive input component; and
- responsive to determining to disable the particular presence-sensitive input component located at the side of the housing opposite the object detection sensor, disable the particular presence-sensitive input component.

17. The non-transitory computer-readable storage medium of claim 16, wherein:
- the sensor data generated by the different sensor comprises an indication of the orientation of the computing device, and
- execution of the instructions causes the at least one processor to determine whether to disable the particular presence-sensitive input component by causing the at least one processor to determine whether to disable the particular presence-sensitive input component based at least in part on the orientation of the computing device.

18. The non-transitory computer-readable storage medium of claim 16, wherein the different sensor and the object detection sensor are located at the same side of the housing.

19. The non-transitory computer-readable storage medium of claim 16, wherein the contextual information includes at least one of the following:
- a type of an application currently being executed by the computing device; or
- or a current status of the application currently being executed by the computing device.

20. The non-transitory computer-readable storage medium of claim 16, wherein execution of the instructions causes the at least one processor to, responsive to determining not to disable the particular presence-sensitive input component, adjust, based on the whether the particular presence-sensitive input component is the first presence-sensitive input component or the second presence-sensitive input component, at least one parameter of one or more cellular radio antennas of the computing device.

* * * * *